(12) United States Patent
Nasukawa et al.

(10) Patent No.: US 11,132,393 B2
(45) Date of Patent: Sep. 28, 2021

(54) IDENTIFYING EXPRESSIONS FOR TARGET CONCEPT WITH IMAGES

(71) Applicant: INTERNATIONAL BUSINESS MACHINES CORPORATION, Armonk, NY (US)

(72) Inventors: Tetsuya Nasukawa, Kanagawa-ken (JP); Masayasu Muraoka, Tokyo (JP); Khan Md. Anwarus Salam, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/174,923

(22) Filed: Oct. 30, 2018

(65) Prior Publication Data

US 2020/0134055 A1   Apr. 30, 2020

(51) Int. Cl.
*G06F 16/00* (2019.01)
*G06F 16/583* (2019.01)
*G06F 16/9535* (2019.01)

(52) U.S. Cl.
CPC ...... *G06F 16/5846* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 8,065,611 B1* | 11/2011 | Chan | G06Q 30/0224 715/253 |
| 9,323,784 B2* | 4/2016 | King | G06F 16/5846 |
| 9,436,891 B2* | 9/2016 | Oishi | G06K 9/72 |
| 9,652,846 B1* | 5/2017 | Codella | G16H 50/30 |
| 9,965,704 B2* | 5/2018 | Zhou | G06K 9/6223 |
| 10,296,531 B2* | 5/2019 | Tang | G06F 16/36 |
| 10,467,289 B2* | 11/2019 | Ambwani | G06F 16/7844 |
| 2011/0010363 A1* | 1/2011 | Homma | G06Q 30/02 707/723 |
| 2015/0036930 A1* | 2/2015 | Oishi | G06F 40/247 382/190 |
| 2015/0079553 A1 | 5/2015 | Arnold | |
| 2020/0090395 A1* | 3/2020 | Wang | G06K 9/00718 |

* cited by examiner

*Primary Examiner* — Debbie M Le
(74) *Attorney, Agent, or Firm* — Tutuniian & Bitetto, P.C.; Randall Bluestone (57) ABSTRACT

A computer-implemented method for identifying an expression for a target concept, includes: obtaining a set of texts as a target set of texts, with each text being associated with one of images relevant to a target concept. Candidate expressions for the target concept are extracted from the target set of texts. The candidate expressions are characteristic of the target set of texts. Each image relevant to one of the candidate expressions is collected by using an image search engine. A target expression for the target concept is selected from the candidate expressions based on a comparison result of the target concept and the collected images.

20 Claims, 6 Drawing Sheets

| Tweet ID | Text | User ID | Image URL | Expressions |
|---|---|---|---|---|
| 10100001 | xxxxxxxxx | 02547 | https://xxx.xxx.com/x01.jpg | ... |
| 10100002 | xxxxxxxxx | 02478 | https://xxx.xxx.com/x02.jpg | car, day, livery, morning, ... |
| 10100003 | xxxxxxxxx | 03687 | https://xxx.xxx.com/x03.jpg | ... |
| 10100004 | xxxxxxxxx | 02547 | https://xxx.xxx.com/x04.jpg | adventure, car, look, today, ... |
| 10100005 | xxxxxxxxx | 04582 | https://xxx.xxx.com/x05.jpg | ... |
| 10100006 | xxxxxxxxx | 01014 | https://xxx.xxx.com/x06.jpg | car, launch, ride, sale, ... |
| 10100007 | xxxxxxxxx | 03251 | https://xxx.xxx.com/x07.jpg | day, look, vehicle, whip, ... |
| 10100008 | xxxxxxxxx | 05287 | https://xxx.xxx.com/x08.jpg | ... |
| 10100009 | xxxxxxxxx | 01014 | https://xxx.xxx.com/x09.jpg | photo, pic, morning, truck, ... |
| 10100010 | xxxxxxxxx | 03695 | https://xxx.xxx.com/x10.jpg | ... |
| ... | ... | ... | ... | ... |

FIG.4

| Tweet ID | Text | User ID | Image URL | Expressions |
|---|---|---|---|---|
| 10100002 | xxxxxxxxx | 02478 | https://xxx.xxx.com/x02.jpg | car, day, livery, morning, ... |
| 10100004 | xxxxxxxxx | 02547 | https://xxx.xxx.com/x04.jpg | adventure, car, look, today, ... |
| 10100006 | xxxxxxxxx | 01014 | https://xxx.xxx.com/x06.jpg | car, launch, ride, sale, ... |
| 10100007 | xxxxxxxxx | 03251 | https://xxx.xxx.com/x07.jpg | day, look, vehicle, whip, ... |
| 10100009 | xxxxxxxxx | 01014 | https://xxx.xxx.com/x09.jpg | photo, pic, morning, truck, ... |
| ⋮ | ⋮ | ⋮ | ⋮ | ⋮ |

IDENTIFYING EXPRESSIONS FOR TARGET CONCEPT WITH IMAGES

BACKGROUND

Technical Field

The present invention relates to identifying at least one expression for a target concept.

Description of the Related Art

Recently, various techniques have been known regarding identifying at least one expression for a target concept.

SUMMARY

According to an embodiment of the present invention, there is provided a computer-implemented method for identifying at least one expression for a target concept. The method includes obtaining a set of texts as a target set of texts each associated with one of images relevant to a target concept. The method further includes extracting candidate expressions for the target concept from the target set of texts, the candidate expressions being characteristic of the target set of texts. The method further includes collecting images each relevant to one of the candidate expressions by using an image search engine. The method further includes selecting a target expression for the target concept from the candidate expressions, based on a comparison result of the target concept and the collected images.

According to another embodiment of the present invention, there is provided an apparatus for identifying at least one expression for a target concept. The apparatus includes a processor and a memory coupled to the processor. The memory includes program instructions. The program instructions are executable by the processor to cause the processor to perform the aforementioned method.

According to yet another embodiment of the present invention, there is provided a computer program product for identifying at least one expression for a target concept. The computer program product includes a computer readable storage medium having program instructions embodied with the computer readable storage medium. The program instructions are executable by a computer to cause the computer to perform the aforementioned method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Hereinafter, an exemplary embodiment of the present invention will be described in detail with reference to the attached drawings.

It is to be noted that the present invention is not limited to the exemplary embodiment to be given below and can be implemented with various modifications within the scope of the present invention. In addition, the drawings used herein are for purposes of illustration, and may not show actual dimensions.

There are quite a few cases where an expression in an individual's mother tongue is unknown for a concept (e.g., an object) in which the existence or the meaning is known. In addition, there are many cases where an expression for a concept in languages other than an individual's mother tongue.

In view of this, the exemplary embodiment suggests to an operator an expression (e.g., word or phrase) for a concept by analyzing a set of texts, with each text being associated with at least one image. The embodiments of the present invention can be implemented in machine-learning based language translation systems, intelligent thesaurus systems, and systems aiding individuals suffering from aphasias, such as Anomic Aphasia in which an individual has difficulty finding the correct word to express a concept, resulting from strokes, head injuries, or neurodegenerative diseases such as Alzheimer's disease, for example.

Figure 1:
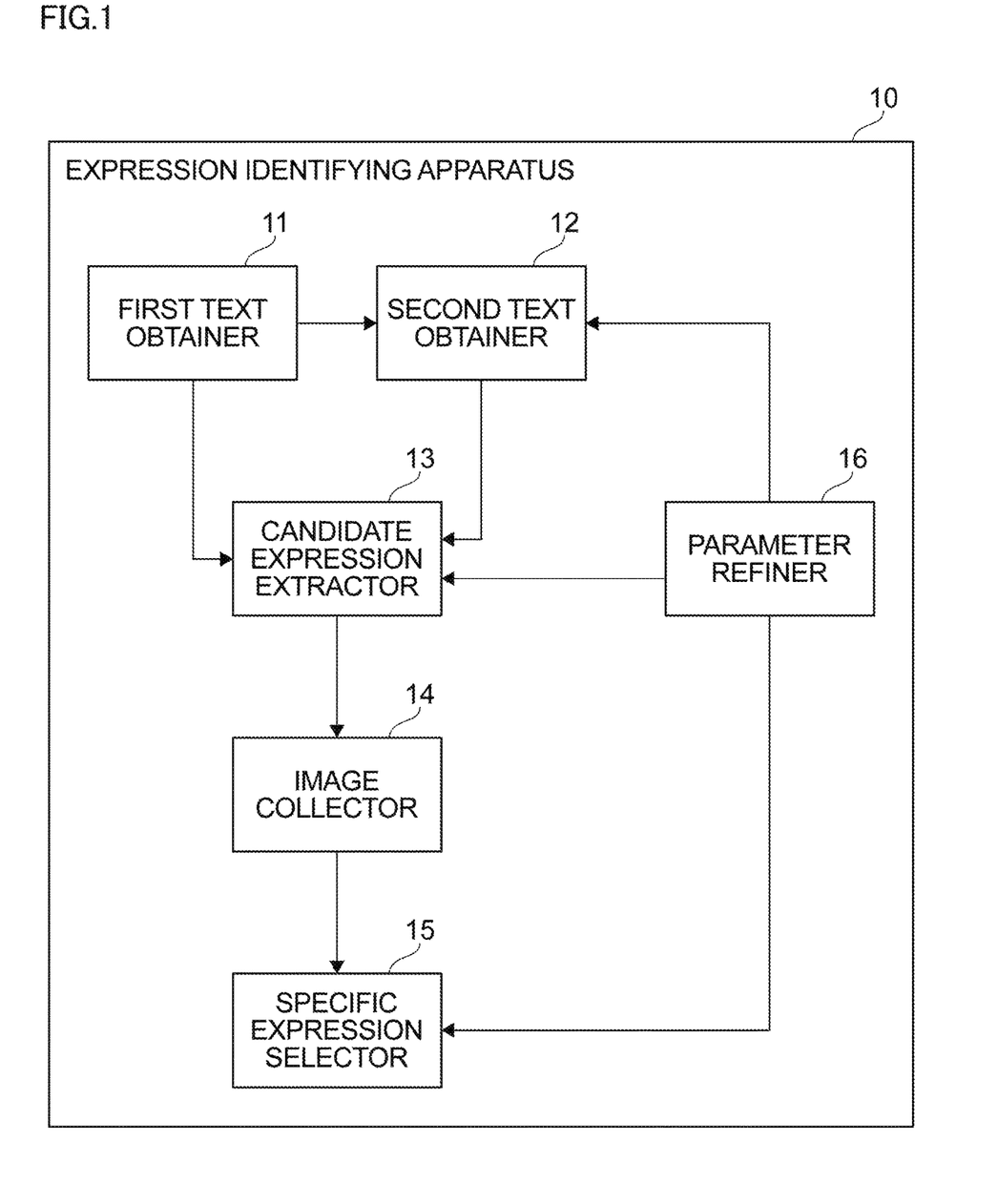
FIG. 1 depicts a block diagram of an expression identifying apparatus according to an embodiment of the present invention.

Referring to FIG. 1, there is shown a block diagram of an expression identifying apparatus 10 to which the exemplary embodiment is applied. As shown in FIG. 1, the expression identifying apparatus 10 can include a first text obtainer 11, a second text obtainer 12, a candidate expression extractor 13, an image collector 14, a specific expression selector 15, and a parameter refiner 16.

The first text obtainer 11 can obtain the first set of texts serving as one example of the initial set of texts. The first set of texts can include texts in which each text is associated with one or more images relevant to various concepts (e.g., one or more images showing various concepts). Specifically, the first text obtainer 11 can collect the first set of texts from a social networking service (SNS) such as Twitter™. Hereinafter, the first set of texts is referred to as a set A.

The second text obtainer 12 can obtain the second set of texts serving as one example of the target set of texts. The second set of texts can include texts in which each text is associated with one or more images relevant to a specific concept S (e.g., one or more images showing the specific concept S). The specific concept S is assumed to be a concept the existence or the meaning of which an operator of the expression identifying apparatus 10 knows, but for which he or she does not know the proper expression, and serves as one example of the target concept. Specifically, the second text obtainer 12 can extract the second set of texts from the first set of texts by using an image recognition system. The image recognition system can perform image recognition of an image, and associate a label to the image indicating a concept recognized from the image by the image recognition, and a confidence level of the image recognition recognizing the concept. Thus, the second text obtainer 12 can extract the second set of texts, each text being associated with one or more images, having a label indicating the specific concept S, and a confidence level exceeding a predefined threshold. This is because the second set of texts, each text being associated with the one or more images, having such a label, is likely to contain expressions for the specific concept S. Hereinafter, the second set of texts is referred to as a set B.

The candidate expression extractor 13 can extract candidate expressions C for the specific concept S from the set B. The candidate expressions C can be highly correlated with the specific concept S, namely, characteristic of the set B.

First, the candidate expression extractor 13 can extract a predefined number of expressions from the set B. Alternatively, the candidate expression extractor 13 can extract from the set B expressions used by more than a predefined number or percentage of users. This is to reduce the possibility of extracting expressions that frequently appear in the set B due to frequent use by a limited small number of users.

Secondly, the candidate expression extractor 13 can calculate, for each expression E of the extracted expressions, the first distribution of the expression E in the set A, and the second distribution of the expression E in the set B. Specifically, the candidate expression extractor 13 can calculate, for each expression E, a percentage of texts containing the expression E in the set A (RatioE_in_A) and a percentage of texts containing the expression E in the set B (RatioE_in_B). Alternatively, the candidate expression extractor 13 can obtain, for each of the extracted expressions, the first distribution and the second distribution without calculating them. For example, the candidate expression extractor 13 can obtain the first distribution by being given as the first distribution a distribution of the expression in an ordinary set of texts. Note that the ordinary set of texts indicates a set of texts prepared in advance as a set showing a general tendency, unlike a set of texts actually collected such as the set A.

Thirdly, the candidate expression extractor 13 can determine, for each expression E of the extracted expressions, whether or not the expression E is one of the candidate expressions C based on a comparison result of the first distribution and the second distribution. Specifically, the candidate expression extractor 13 can determine, for each expression E, the expression E to be one of the candidate expressions C if RatioE_in_B/RatioE_in_A exceeds a predefined threshold.

Thus, the second text obtainer 12 and the candidate expression extractor 13 can narrow down expressions to identify specific expressions for the specific concept S. This eliminates the need for determining using images, for each expression E of all the expressions, whether or not the expression E is one of the specific expressions, and the specific expressions for the specific concept S can be identified with fewer computer resources than a conventional technology.

The image collector 14 can collect, for each expression E in the candidate expressions C, images relevant to the expression E by using an image search engine. Specifically, the image collector 14 can collect, for each expression E, the images by using the image search engine with the expression E set as a key. The image search engine can be a local or cloud-based image database searchable by inputting one or more descriptive keywords (e.g., expressions).

The specific expression selector 15 can select one or more specific expressions for the specific concept S from the candidate expressions C, based on a comparison result of the specific concept S and the images collected by the image collector 14.

First, the specific expression selector 15 can obtain, for each expression E in the candidate expressions C, a concept by performing image recognition of the images relevant to the expression E collected by the image collector 14. Specifically, the specific expression selector 15 can apply, for each expression E, image recognition by an image recognition system to the images collected by the image search engine with the expression E set as a key. The image recognition system can perform image recognition of an image, and provide the image with a label indicating a concept recognized from the image by the image recognition and a confidence level of the image recognition to recognize the concept.

Secondly, the specific expression selector 15 can determine, for each expression E in the candidate expressions C, whether or not the expression E is one of the specific expressions for the specific concept S based on a comparison result of the specific concept S and the obtained concept. Specifically, the specific expression selector 15 can determine, for each expression E, the expression E to be the specific expression for the specific concept S, if a predefined percentage or more of the images have labels each indicating the specific concept S and confidence levels of the image recognition to recognize the specific concept S each exceeding a predefined threshold among the images collected by the image search engine with the expression E set as a key. Alternatively, the specific expression selector 15 can determine, for each expression E, the expression E to be the specific expression for the specific concept S, if one or more images have labels each indicating the specific concept S and confidence levels of the image recognition to recognize the specific concept S among the images collected by the image search engine with the expression E set as a key, and an average of the confidence levels exceeds a predefined threshold. In this case, the average can be an average of confidence levels held by the images collected by the image search engine, or an average of confidence levels held by the above-mentioned one or more images.

The parameter refiner 16 can refine parameters for better output. The parameters can include the predefined threshold referenced by the second text obtainer 12 to determine whether or not the confidence level of the image recognition exceeds this threshold. The parameters can include the predefined number indicating the number of expressions to be extracted by the candidate expression extractor 13 from the set B, and the predefined number or percentage indicating the number or percentage of users who have used expressions to be extracted by the candidate expression extractor 13 from the set B. The parameters can further include the predefined threshold referenced by the candidate expression extractor 13 to determine whether or not RatioE_in_B/RatioE_in_A exceeds this threshold. The parameters can include the predefined percentage indicating the percentage of the images required for the specific expression selector 15 to determine the expression to be the specific expression for the specific concept S. The parameters can further include the predefined threshold referenced by the specific expression selector 15 to determine whether or not the confidence level of the image recognition or the average of the confidence levels of the image recognition exceeds this threshold.

Next, an operation of the expression identifying apparatus 10 according to the exemplary embodiment is described.

Figure 2:
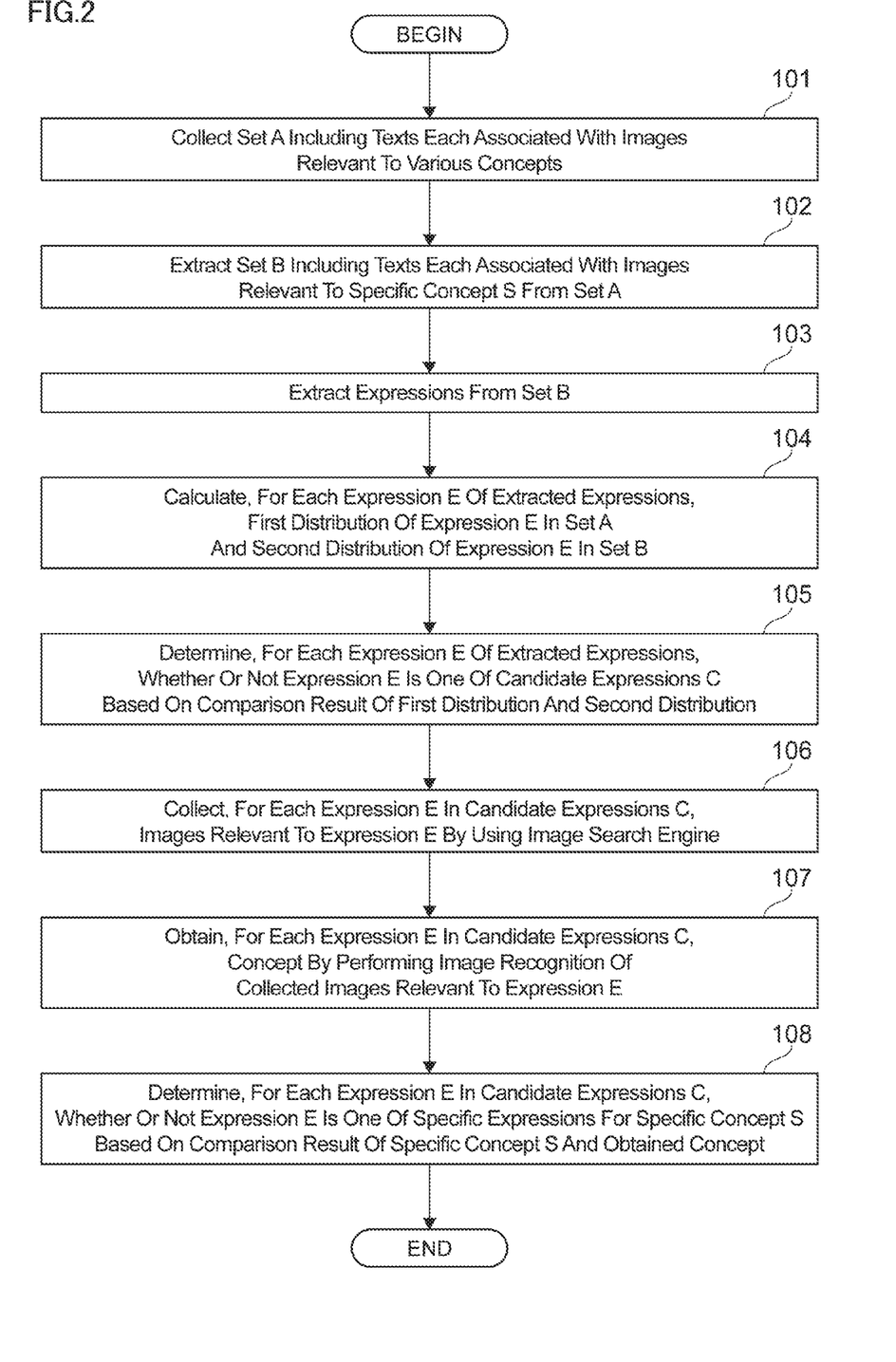
FIG. 2 depicts a flowchart representing an example of an operation performed by the expression identifying apparatus in identifying one or more specific expressions for a specific concept according to an embodiment of the present invention.

Referring to FIG. 2, there is shown a flowchart representing an example of an operation performed by the expression identifying apparatus 10 in identifying one or more specific expressions for the specific concept S.

First, the first text obtainer 11 can collect the set A including texts in which each text is associated with one or more images relevant to various concepts (block 101).

Next, the second text obtainer 12 can extract the set B including texts in which each text is associated with one or more images relevant to the specific concept S, from the set A collected at block 101 (block 102).

Subsequently, the candidate expression extractor 13 can extract expressions from the set B (block 103). The candidate expression extractor 13 can calculate, for each expression E of the expressions extracted at block 103, the first distribution of the expression E in the set A, and the second distribution of the expression E in the set B (block 104). The candidate expression extractor 13 can determine, for each expression E of the expressions extracted at block 103, whether or not the expression E is one of the candidate expressions C based on a comparison result of the first distribution and the second distribution calculated at block 104 (block 105).

After that, the image collector 14 can collect, for each expression E in the candidate expressions C determined at block 105, images relevant to the expression E by using an image search engine (block 106).

Subsequently, the specific expression selector 15 can obtain, for each expression E in the candidate expressions C determined at block 105, a concept by performing image recognition of the images relevant to the expression E collected at block 106 (block 107). The specific expression selector 15 can determine, for each expression E in the candidate expressions C determined at block 105, whether or not the expression E is one of the specific expressions for the specific concept S based on a comparison result of the specific concept S and the concept obtained at block 107 (block 108).

Next, the operation shown in the flowchart of FIG. 2 is described using a specific example. In the specific example, the specific concept S is assumed to be a concept "vehicle". That is, the expression identifying apparatus 10 is assumed to be operated by an operator who knows the existence or the meaning of the concept "vehicle" but does not know the name (e.g., expression) for the concept "vehicle".

Figure 3:
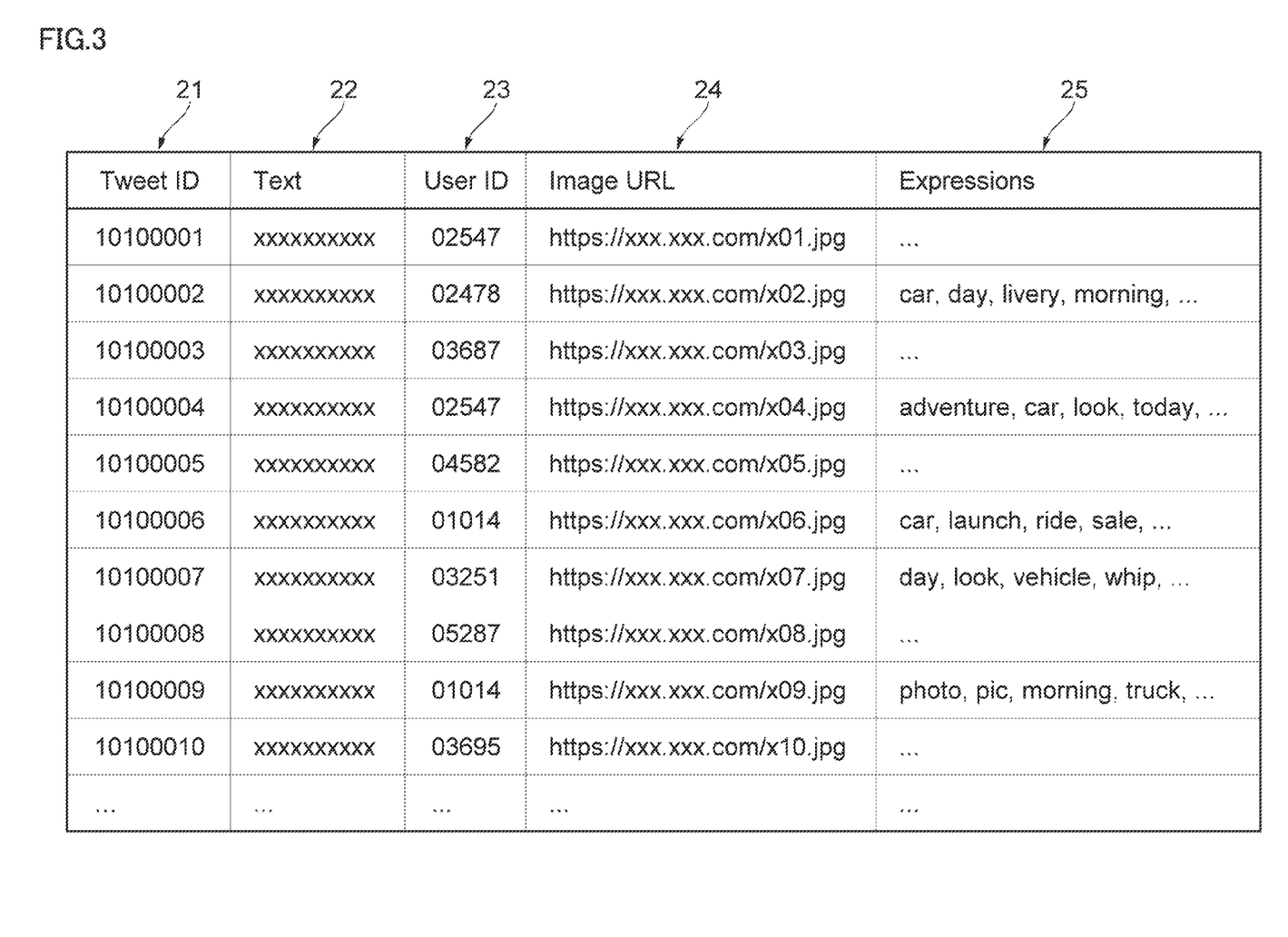
FIG. 3 depicts an example of a set A according to an embodiment of the present invention.

Referring to FIG. 3, there is shown an example of the set A. The first text obtainer 11 can collect the set A at block 101. As shown in FIG. 3, the set A can include a tweet ID 21, a text 22, a user ID 23, an image URL 24, and expressions 25.

The tweet ID 21 can indicate identification information of a tweet.

The text 22 can indicate a character string included in the corresponding tweet. All texts can be assumed to be different for each tweet, although indicated by "xxxxxxxxxx" in FIG. 3.

The user ID 23 can indicate identification information of a user who has posted the corresponding tweet.

The image URL 24 can indicate a URL of an image with which the corresponding text is associated.

The expressions 25 can indicate a set of words extracted from the corresponding text. The set of words can include words of one or more predefined parts of speech. The set of words includes a set of nouns in FIG. 3, but alternatively can include a set of adjectives. Further, in FIG. 3, the images indicated by the image URLs corresponding to the tweet IDs "10100002", "10100004", "10100006", "10100007", and "10100009" are assumed to be relevant to the concept "vehicle". Thus, the expressions such as "vehicle", "car", and "truck" are extracted from the texts corresponding to the tweet IDs "10100002", "10100004", "10100006", "10100007", and "10100009". On the other hand, the images indicated by the image URLs corresponding to the other tweet IDs are assumed to not be relevant to the concept "vehicle", so examples of expressions extracted from the texts corresponding to the other tweet IDs are omitted.

Figure 4:
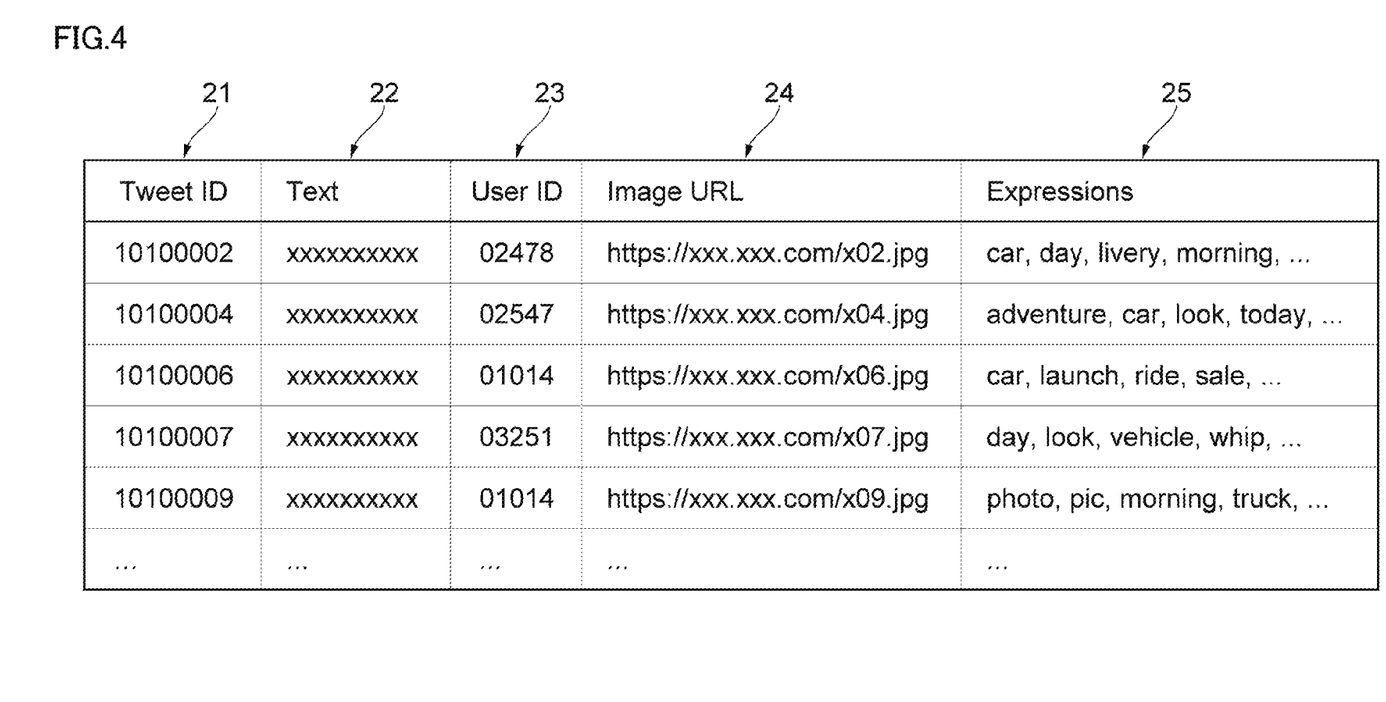
FIG. 4 depicts an example of a set B according to an embodiment of the present invention.

Referring to FIG. 4, there is shown an example of the set B. The second text obtainer 12 can extract the set B from the set A at block 102. As shown in FIG. 4, the set B can also include a tweet ID 21, a text 22, a user ID 23, an image URL 24, and expressions 25. The meaning of these items has been explained with reference to FIG. 3, so the explanation here is omitted.

As the result of image recognition of the images indicated by the image URLs of FIG. 3, it is seen that the images corresponding to the tweet IDs "10100002", "10100004", "10100006", "10100007", and "10100009" are relevant to the concept "vehicle". Thus, in FIG. 4, only the rows including the tweet IDs "10100002", "10100004", "10100006", "10100007", and "10100009" are extracted.

Figure 5:
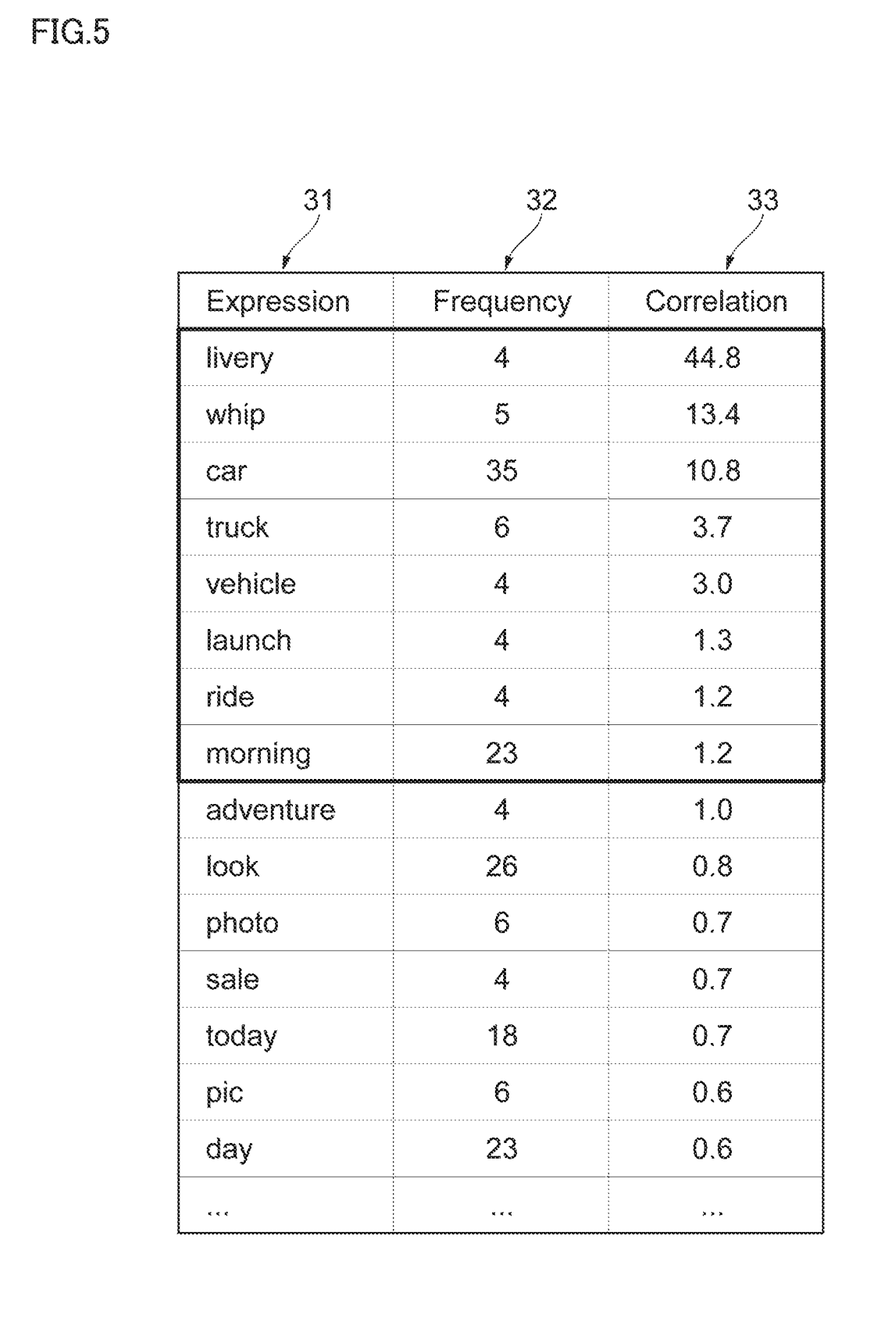
FIG. 5 depicts an example of a list used to determine candidate expressions according to an embodiment of the present invention.

Referring to FIG. 5, there is shown an example of a list used to determine the candidate expressions C. As shown in FIG. 5, the list can include an expression 31, a frequency 32, and a correlation 33.

The expression 31 can indicate a list of expressions. The candidate expression extractor 13 can extract the expressions from the set B at block 103. The expressions can be a predefined number of expressions among the expressions shown in FIG. 4. Alternatively, the expressions can be expressions used by more than a predefined number or percentage of users among the expressions shown in FIG. 4. In this case, the expressions can be identified by the user IDs of FIG. 4. Although not all the expressions extracted from the set B are included in the list in general, all expressions shown in FIG. 4 are assumed to be included in the list in FIG. 5.

The frequency 32 can indicate the number of tweets including texts containing the corresponding expression E. The frequency 32 can be obtained to calculate the second distribution of the corresponding expression E in the set B (RatioE_in_B). Thus, the candidate expression extractor 13 can calculate a frequency for each expression E at block 104. Meanwhile, the candidate expression extractor 13 can obtain the first distribution of the corresponding expression E in the set A (RatioE_in_A) in any way at block 104.

The correlation 33 can indicate a value showing how highly the corresponding expression E is correlated with texts included in the set B. In other words, the correlation 33 can indicate RatioE_in_B/RatioE_in_A. Thus, the candidate expression extractor 13 can calculate a correlation for each expression E at block 105. Then, the candidate expression extractor 13 can determine, for each expression E, the expression E to be one of the candidate expressions C, if RatioE_in_B/RatioE_in_A exceeds a predefined threshold at block 105. In FIG. 5, the predefined threshold is assumed to be 1.0, and the candidate expression extractor 13 is assumed to determine the expressions surrounded by a bold line to be the candidate expressions C.

After that, the image collector 14 can collect, for each expression E in the candidate expressions C surrounded by the bold line, images relevant to the expression E by using the image search engine at block 106. For example, the image collector 14 can collect images by using the image search engine with the expression "livery" set as a key. The image collector 14 can collect images by using the image search engine with the expression "whip" set as a key. The image collector 14 can collect images by using the image search engine with the expression "car" set as a key. The image collector 14 can collect images by using the image search engine similarly with respect to the other expressions in the candidate expressions C.

Subsequently, the specific expression selector 15 can obtain, for each expression E in the candidate expressions C, a concept by performing image recognition of the collected images relevant to the expression E at block 107. For example, the specific expression selector 15 can obtain a concept by performing image recognition of the images collected with the expression "livery". The specific expression selector 15 can obtain a concept by performing image recognition of the images collected with the expression "whip". The specific expression selector 15 can obtain a concept by performing image recognition of the images collected with the expression "car". The specific expression selector 15 can obtain a concept by performing image recognition of the collected images similarly with respect to the other expressions in the candidate expressions C.

The specific expression selector 15 can determine, for each expression E in the candidate expressions C, the expression E to be one of the specific expressions for the specific concept S if the obtained concept matches the concept "vehicle" at block 108. For example, the expression "launch" has the possibility of appearing in texts in which each text is associated with an image relevant to the concept "vehicle", but the concept of launch of a rocket can be obtained as a result of image recognition of the images collected with the expression "launch". In addition, the expression "ride" has the possibility of appearing in texts in which each text is associated with an image relevant to the concept "vehicle", but the concept of riding of a bicycle or a motorcycle can be obtained as a result of image recognition of the images collected with the expression "ride". On the other hand, the concept "vehicle" can be obtained as a result of image recognition of the images collected with the expressions "vehicle", "car", or "truck". Thus the specific expression selector 15 can determine the expressions "vehicle", "car", and "truck" to be the expressions for the concept "vehicle". In the exemplary embodiment, not only the expression "vehicle" but also the expressions "car" and "truck", which are hyponyms of the expression "vehicle", can be determined to be the expressions for the concept "vehicle".

Figure 6:
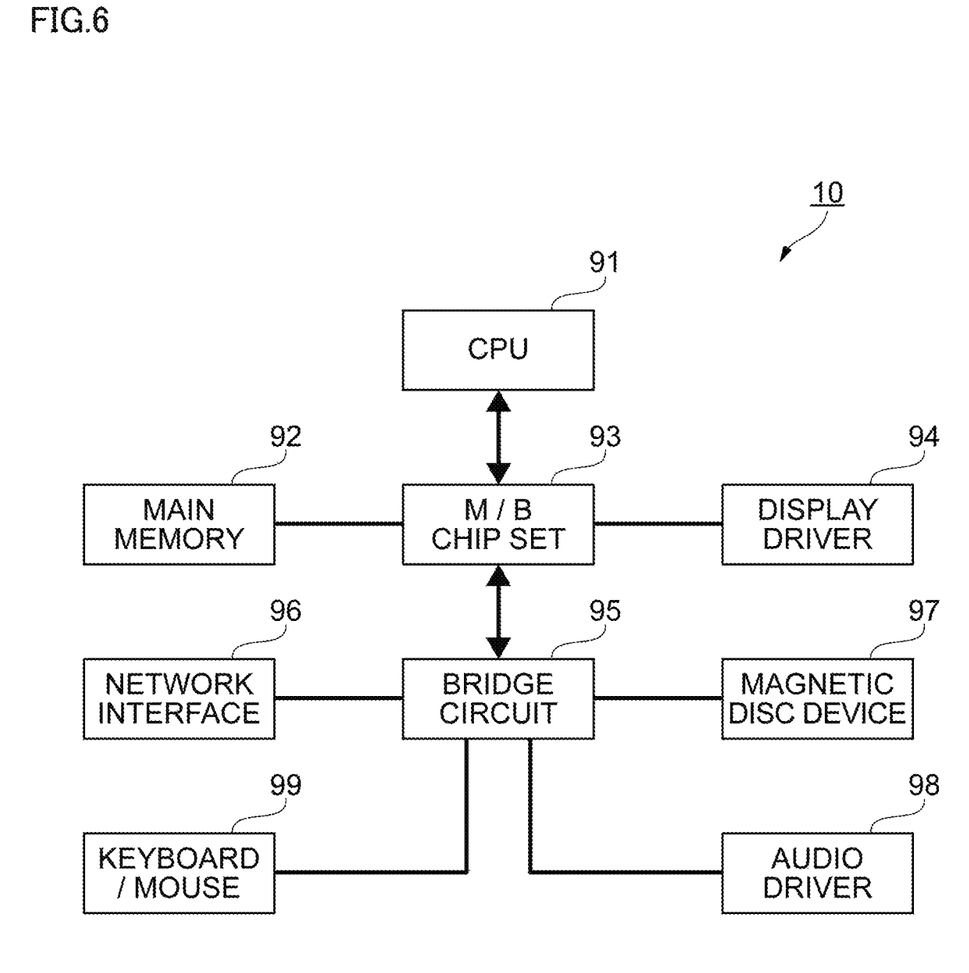
FIG. 6 depicts an example of a hardware configuration of the expression identifying apparatus in according to an embodiment of the present invention.

Referring to FIG. 6, there is shown an example of a hardware configuration of the expression identifying apparatus 10 in the exemplary embodiment. As shown in the figure, the expression identifying apparatus 10 can include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 6, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 can be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express can be used for the connection, for example. For connecting the magnetic disk device 97 to the bridge circuit 95, a serial AT attachment (ATA), a parallel-transmission ATA, or peripheral components interconnect (PCI) can be used. For connecting the keyboard/mouse 99 to the bridge circuit 95, a universal serial bus (USB) can be used.

In the foregoing description, an explanation has been given regarding the case where, when a file is updated, an index including metadata of the file of a pre-update version and metadata of the file of the post-update version is written to the tape medium 10. However, the exemplary embodiments can be applied to the case where, when a file is deleted, an index not including metadata of the file is written to the tape medium 10.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying at least one expression for a target concept, the method comprising:

obtaining a target set of texts, each text being associated with one image from images relevant to a target concept;

extracting candidate expressions for the target concept from the target set of texts, the candidate expressions being characteristic of the target set of texts, and being determined based on a ratio comparison result of a first distribution and a second distribution exceeding an image confidence level threshold;

collecting candidate images, each candidate image being relevant to one of the candidate expressions, by using an image search engine; and selecting a target expression for the target concept from the candidate expressions, based on a comparison result of the target concept and the collected candidate images.

2. The method of claim 1, further comprising obtaining an initial set of texts, each text being associated with one image from images relevant to various concepts, wherein obtaining the target set of texts comprises extracting the target set of texts from the initial set of texts by performing image recognition of the images relevant to the various concepts to find the images relevant to the target concept.

3. The method of claim 2, further comprising refining a parameter used in extracting the target set of texts from the initial set of texts.

4. The method of claim 1, wherein extracting the candidate expressions comprises:

obtaining the first distribution and the second distribution, the first distribution being a distribution of expressions in an ordinary set of texts, the second distribution being a distribution of the expressions in the target set of texts.

5. The method of claim 4, further comprising refining at least one of a parameter used in obtaining the first distribution and the second distribution, and a parameter used in determining the expressions to be the candidate expressions.

6. The method of claim 1, wherein selecting the target expression comprises:

obtaining a concept by performing image recognition of the collected images relevant to one of the candidate expressions; and determining one of the candidate expressions to be the target expression on condition that the obtained concept matches the target concept.

7. The method of claim 6, further comprising refining a parameter used in determining the one of the candidate expressions to be the target expression.

8. The method of claim 1, wherein the target concept is a concept where an existence or a meaning of which an operator knows but which the operator is unable to name.

9. An apparatus for identifying at least one expression for a target concept, the apparatus comprising:
 a processor; and
 a memory coupled to the processor, the memory comprising program instructions executable by the processor to cause the processor to at least:
  obtain a target set of texts, each text being associated with one image from images relevant to a target concept;
  extract candidate expressions for the target concept from the target set of texts, the candidate expressions being characteristic of the target set of texts, and being determined based on a ratio comparison result of a first distribution and a second distribution exceeding an image confidence threshold;
  collect candidate images, each candidate image being relevant to one of the candidate expressions, by using an image search engine; and
  select a target expression from the candidate expressions, based on a comparison result of the target concept and the collected candidate images.

10. The apparatus of claim 9, wherein the processor obtains the target set of texts by executing program instructions to cause the processor to at least:
 obtain an initial set of texts, each text being associated with one image from images relevant to various concepts; and
 extract the target set of texts from the initial set of texts by performing image recognition of the images relevant to the various concepts to find the images relevant to the target concept.

11. The apparatus of claim 10, wherein the memory further comprises program instructions executable by the processor to cause the processor to at least refine a parameter used in extracting the target set of texts from the initial set of texts.

12. The apparatus of claim 9, wherein the processor extracts the candidate expressions by executing program instructions to cause the processor to at least:
 obtain the first distribution and the second distribution, the first distribution being a distribution of expressions in an ordinary set of texts, the second first distribution being a distribution of the expressions in the target set of texts.

13. The apparatus of claim 12, wherein the memory further comprises program instructions executable by the processor to cause the processor to at least refine at least one of a parameter used in obtaining the first distribution and the second distribution, and a parameter used in determining the expressions to be the candidate expressions.

14. The apparatus of claim 9, wherein the processor selects the target expression by executing program instructions causing the processor to at least:

obtain a concept by performing image recognition of the collected images relevant to one of the candidate expressions; and
 determine the one of the candidate expressions to be the target expression on condition that the obtained concept matches the target concept.

15. The apparatus of claim 14, wherein the memory further comprises program instructions executable by the processor to cause the processor to at least refine a parameter used to determine the one of the candidate expressions to be the target expression.

16. The apparatus of claim 9, wherein the target concept is a concept where an existence or a meaning of which an operator knows but which the operator is unable to name.

17. A computer program product for identifying at least one expression for a target concept, the computer program product comprising a computer readable storage medium having program instructions embodied therewith, the program instructions executable by a computer to cause the computer to perform a method comprising:
 obtaining a target set of texts, each text being associated with one image from images relevant to a target concept;
 extracting candidate expressions for the target concept from the target set of texts, the candidate expressions being characteristic of the target set of texts, and being determined based on a ratio comparison result of a first distribution and a second distribution exceeding an image confidence level threshold;
 collecting candidate images, each candidate image being relevant to one of the candidate expressions, by using an image search engine; and
 selecting a target expression from the candidate expressions, based on a comparison result of the target concept and the collected candidate images.

18. The computer program product of claim 17, wherein obtaining the target set of texts comprises:
 obtaining an initial set of texts, each text being associated with one image from images relevant to various concepts; and
 extracting the target set of texts from the initial set of texts by performing image recognition of the images relevant to the various concepts to find the images relevant to the target concept.

19. The computer program product of claim 17, wherein extracting the candidate expressions comprises:
 obtaining the first distribution and the second distribution, the first distribution being a distribution of expressions in an ordinary set of texts, the second first distribution being a distribution of the expressions in the target set of texts.

20. The computer program product of claim 17, wherein selecting the target expression comprises:
 obtaining a concept by performing image recognition of the collected images relevant to one of the candidate expressions; and
 determining one of the candidate expressions to be the target expression on condition that the obtained concept matches the target concept.

\* \* \* \* \*